Patented Nov. 23, 1926.

1,608,421

UNITED STATES PATENT OFFICE.

KARL H. T. PFISTER, OF TACONY, PENNSYLVANIA, ASSIGNOR TO ROHM & HAAS COMPANY, A CORPORATION OF DELAWARE.

PRODUCTION OF A NEUTRAL RESIN FROM GUM ACCROIDES.

No Drawing. Application filed February 11, 1925. Serial No. 8,541.

Gum accroides is a natural gum, of a deep red color and highly acid. Apparently its chemical composition is such that it contains groups which are of the nature of phenolic hydroxy groups. I have discovered that if the hydrogen of these groups is replaced by a radical such as is supplied by an esterifying agent, preferably in an alkaline medium, there will be formed an ester of a resinous nature which has a much less brilliant color than the original gum, is substantially neutral and is practically insoluble in alkalis. This resinous body is, however, soluble in various organic solvents and may therefore be used for varnishes and like materials. Various materials may be used for esterifying such for example, as acetic anhydride, benzoyl chloride, acetyl chloride or an aromatic sulfonchloride.

As an example of the way in which my invention may be carried out, which is given for illustrative purposes only and is not intended to limit the scope of my invention, the following instance is given:

92 parts of gum accroides were dissolved in 650 parts of alcohol and 38 parts of caustic soda solution of 40° Bé. strength were added. This material was then brought to the boiling point and 106 parts of para-toluolsulfonchloride were added. A tough mass immediately separated out, and on the addition of water this mass became solid. It was found that it could be readily dried and powdered and that it was soluble in benzol and butyl acetate, but insoluble in alcohol and the various petroleum distillates.

What I claim is:

1. The method of treating gum accroides which comprises the step of reacting on the same with an esterifying agent.

2. The method of treating gum accroides which comprises the step of reacting on the same with an aromatic sulfonchloride.

3. A process as defined in claim 2, in which the reaction is carried on in the presence of an alkaline medium.

4. A process as defined in claim 2, in which the aromatic sulfonchloride used is para-toluolsulfonchloride.

5. A resinous body comprising the reaction product of gum accroides and an aromatic sulfonchloride.

6. A resinous body comprising the reaction product of gum accroides and toluolsulfonchloride.

KARL H. T. PFISTER.